United States Patent
Saito et al.

(10) Patent No.: US 8,471,937 B2
(45) Date of Patent: Jun. 25, 2013

(54) PHOTOELECTRIC CONVERSION DEVICE, AUTO-FOCUSING APPARATUS, AND IMAGE PICKUP SYSTEM

(75) Inventors: Kazuhiro Saito, Chofu (JP); Daisuke Inoue, Ebina (JP); Yukihiro Kuroda, Kunitachi (JP); Tomohisa Kinugasa, Yokohama (JP); Kouji Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/214,932

(22) Filed: Aug. 22, 2011

(65) Prior Publication Data

US 2012/0050584 A1 Mar. 1, 2012

(30) Foreign Application Priority Data

Aug. 27, 2010 (JP) ................. 2010-191315

(51) Int. Cl.
*H04N 3/14* (2006.01)
*H04N 5/335* (2011.01)

(52) U.S. Cl.
USPC ........... 348/294; 348/298; 348/302; 348/308; 348/312

(58) Field of Classification Search
USPC ....... 348/294, 298, 302, 308, 312; 250/208.1; 257/290–292

See application file for complete search history.

(56) References Cited

U.S. PATENT DOCUMENTS

| 7,964,836 | B2 * | 6/2011 | Uemura | 250/208.1 |
| 2010/0243866 | A1 * | 9/2010 | Mo et al. | 250/214 A |
| 2010/0328479 | A1 * | 12/2010 | Sambongi | 348/222.1 |

FOREIGN PATENT DOCUMENTS

JP 2009-239788 A 10/2009

* cited by examiner

*Primary Examiner* — Yogesh Aggarwal
(74) *Attorney, Agent, or Firm* — Canon U.S.A., Inc. IP Division

(57) ABSTRACT

Each of a plurality of unit pixels includes first and second photoelectric conversion units, and a pixel output unit shared between the first and second photoelectric conversion units. A monitoring unit configured to control the charge-accumulation operation of the first photoelectric conversion unit by monitoring a signal generated based on the second photoelectric conversion unit is provided.

21 Claims, 19 Drawing Sheets

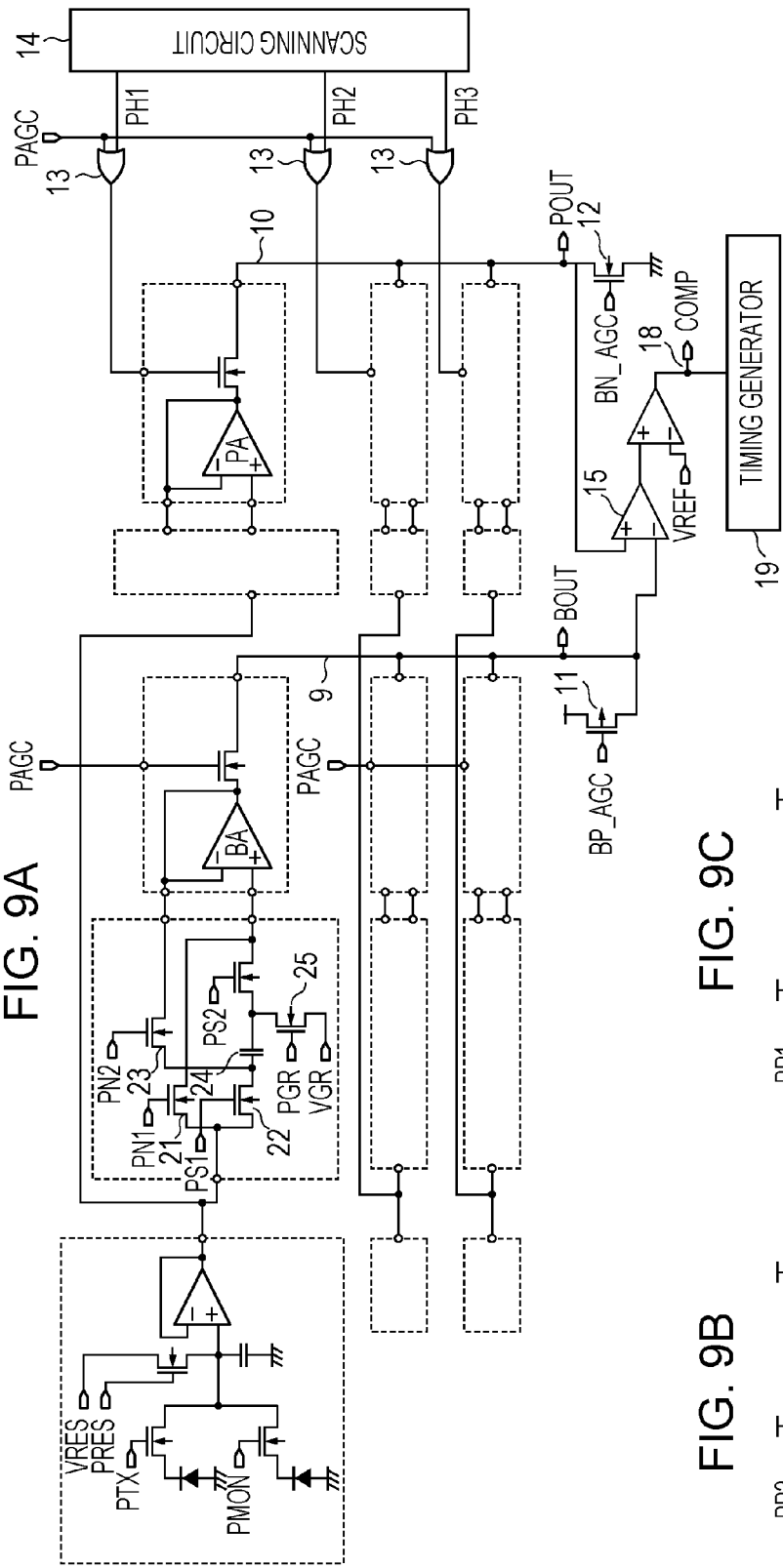
FIG. 9A
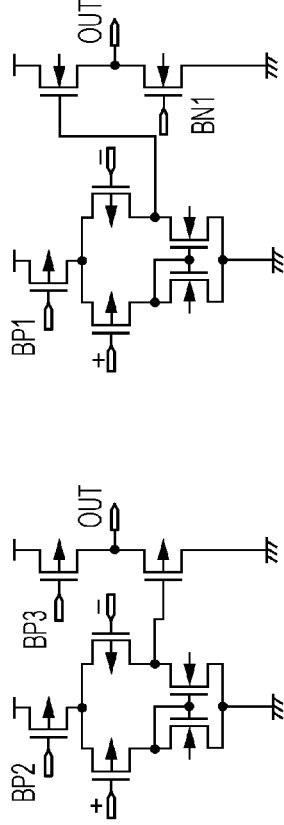
FIG. 9B
FIG. 9C

US 8,471,937 B2

PHOTOELECTRIC CONVERSION DEVICE, AUTO-FOCUSING APPARATUS, AND IMAGE PICKUP SYSTEM

BACKGROUND OF THE INVENTION

1. Field of the Invention

The present invention relates to a photoelectric conversion device, and particularly relates to a photoelectric conversion device performing phase-difference detection-type auto focusing (AF).

2. Description of the Related Art

An auto focusing (hereinafter abbreviated as AF) sensor including a photo-receiving unit for detecting a distance to an object and a sensor for monitoring the light quantity to control accumulation time of the photo-receiving unit is known. According to a configuration disclosed in Japanese Patent Laid-Open No. 2009-239788, a path provided to transmit a signal output from the photo-receiving unit for detecting a distance to an object and a path provided to transmit a signal output from the monitoring sensor, which are different from each other, are provided.

However, according to the configuration disclosed in Japanese Patent Laid-Open No. 2009-239788, a signal output from the photo-receiving unit for distance detection and a signal output from the sensor for monitoring are processed by respectively different detection circuits. Therefore, the difference between the detection circuits may adversely affect the AF characteristics. Further, an increase in the number of the detection circuits may increase the device size or the power consumption.

SUMMARY OF THE INVENTION

The present invention provides a photoelectric conversion device including a plurality of unit pixels, where each of the unit pixels includes a first photoelectric conversion unit, a second photoelectric conversion unit, a pixel output unit for outputting a signal generated based on an amount of electric charge generated by at least one of the first and second photoelectric conversion units, and a first transfer unit for transferring electric charge generated by the first photoelectric conversion unit to the pixel output unit, and a monitoring unit for controlling a charge-accumulation operation of the first photoelectric conversion unit based on a signal output from the pixel output unit, the signal being generated based on an amount of electric charge generated by the second photoelectric conversion unit.

Further features of the present invention will become apparent from the following description of exemplary embodiments with reference to the attached drawings.

BRIEF DESCRIPTION OF THE DRAWINGS

FIG. 9A illustrates the main components of a line-sensor unit according to a third embodiment of the present invention.

FIG. 9B also illustrates the main components of the line-sensor unit according to the third embodiment.

FIG. 9C also illustrates the main components of the line-sensor unit according to the third embodiment.

DESCRIPTION OF THE EMBODIMENTS

First Embodiment

A first embodiment of the present invention will be described below. The first embodiment is exemplarily applied for a photoelectric conversion device for performing the phase-difference auto focusing (hereinafter referred to as AF).

Figure 1:
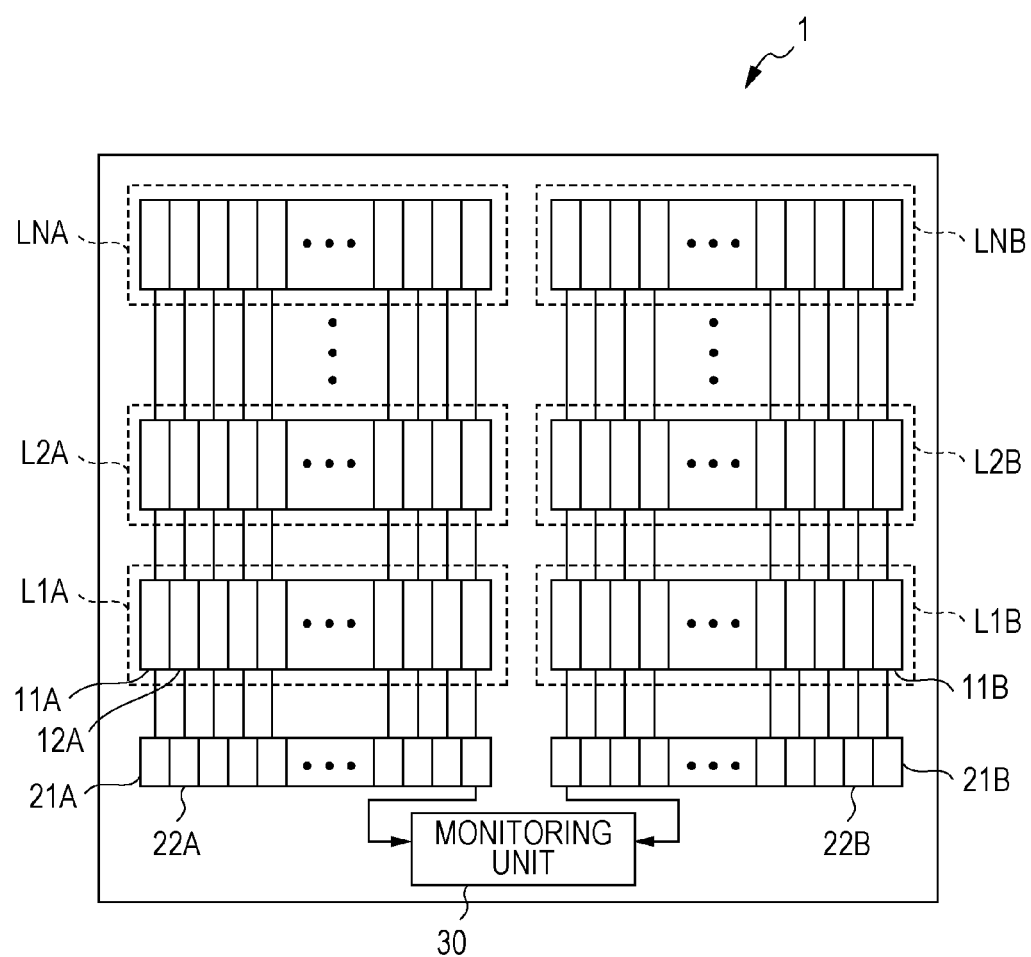
FIG. 1 illustrates the main components of an AF-photoelectric conversion device according to an embodiment of the present invention.

FIG. 1 schematically illustrates the major components of a photoelectric conversion device 1 for performing the phase-difference AF. The photoelectric conversion device 1 includes pairs of line-sensor units L1A and L1B, line-sensor units L2A and L2B, ..., and line-sensor units LNA and LNB. A pair of the line-sensor units is used to measure the defocus amount of an object image, which is attained in a given region of an imaging area. A plurality of range-finding points is provided by arranging two or more pairs of the line-sensor units to increase the AF precision. Each of the line-sensor units includes unit pixels 11A, 12A, and so forth, each having an AF-photoelectric conversion unit for detecting phase-difference and a monitoring photoelectric conversion unit for monitoring the light quantity. The unit pixels of each of the line-sensor units L1A, L2A, ..., LNA, and L1B, L2B, ..., LNB output signals to, for example, a monitoring unit 30 via individual signal-output units 21A, 22A, and so forth, and 21B, 22B, and so forth, where each of the signal-output units is shared among the corresponding unit pixels.

Figure 2:
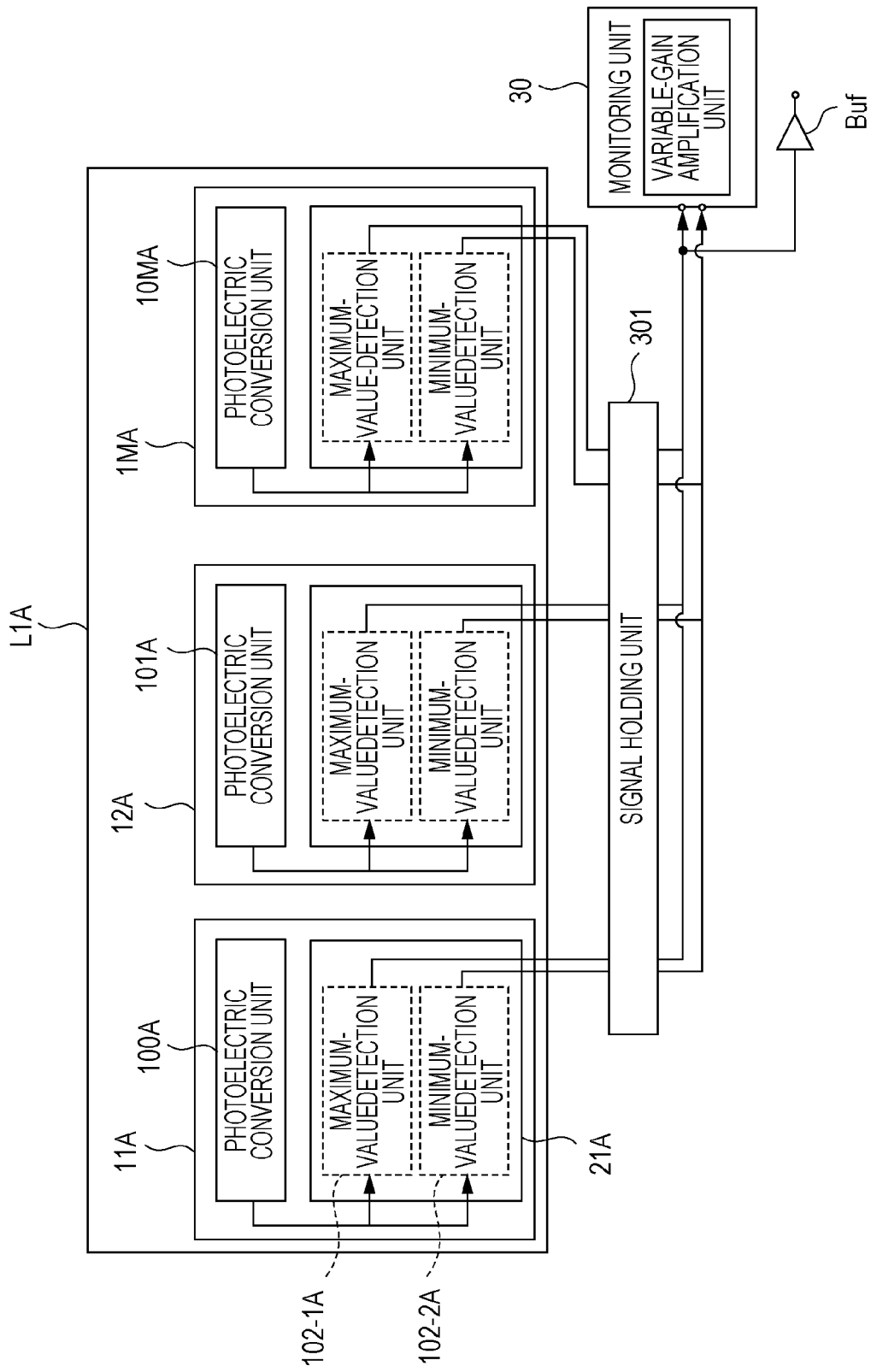
FIG. 2 illustrates the main components of a line-sensor unit according to an embodiment of the present invention.

FIG. 2 illustrates a part relating to the line-sensor unit L1A in more detail. The unit pixel 11A includes a photoelectric conversion unit 100A and a signal output unit 21A, and the signal output unit 21A includes a maximum-value detection unit 102-1A and a minimum-value detection unit 102-2A. A signal output from the photoelectric conversion unit is transmitted to each of the maximum-value detection unit 102-1A and the minimum-value detection unit 102-2A that are provided as, for example, source-follower amplifiers. Additionally, the unit pixel 11A may include a noise-reduction circuit to increase the signal-detection precision. Each of other unit pixels has the same configuration as that of the unit pixel 11A. Since each of the line-sensor units L2A, L3A, and so forth, and L1B, L2B, and so forth has the same configuration as that of the line-sensor unit L1A, the descriptions thereof will be omitted.

The outputs of the maximum-value detection unit and the minimum-value detection unit of each unit pixel are transmitted to the monitoring unit 30 via a signal holding unit 301. The signal holding unit 301 includes a holding unit configured to temporarily hold a signal output from the maximum-value detection unit, and a path provided to transmit signals of the maximum-value detection unit and the minimum-value detection unit to the monitoring unit 30 without holding the signals. During the time period where monitoring operations are performed, which will be described later, the signals are not temporarily held, but are transmitted to the monitoring unit 30 to achieve the light-quantity monitoring in real time. When reading signals from the unit pixels, the signals are temporarily held in the signal holding unit 301 to equalize the lengths of the accumulation periods of the line-sensor units, and the held signals are sequentially transmitted to an output buffer Buf by a scanning circuit (not shown).

The output terminals of the maximum-value detection units of the unit pixels are connected to one another in the subsequent stage of the signal holding unit 301, and those of the minimum-value detection units of the unit pixels are connected to one another in the subsequent stage of the signal holding unit 301. Then, signals that are output from the output terminals of both the maximum-value detection units and the minimum-value detection units are input to the monitoring unit 30. The above-described configuration allows the monitoring unit 30 to detect the maximum value and the minimum value of signals that are output from the line-sensor unit L1A in real time. The value of the signal corresponding to the difference between the maximum value and the minimum value (hereinafter referred to as a P-B signal) exceeds a predetermined threshold value, the monitoring unit 30 outputs a signal which causes the photoelectric conversion unit stop performing charge-accumulation operation. The above-described threshold value may be changed depending on the use condition. Further, the monitoring unit 30 includes a variable gain-amplifier unit to increase the amplification rate of the P-B signal when the contrast of the P-B signal is insufficient.

In this embodiment, the maximum-value detection unit is used to read signals from the individual unit pixels. However, the minimum-value detection unit may be used in place of the maximum-value detection unit.

Figure 3:
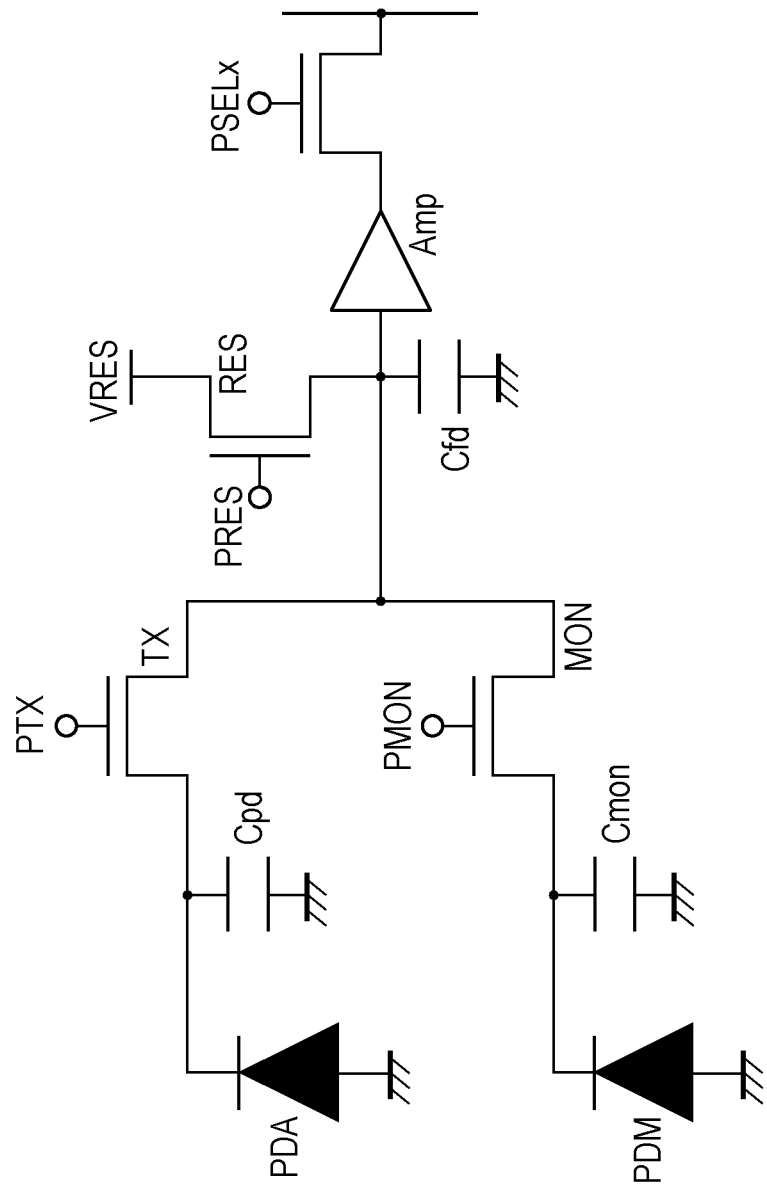
FIG. 3 is an equivalent circuit diagram of a unit pixel according to a first embodiment of the present invention.

FIG. 3 is an equivalent circuit diagram illustrating a part relating to a photoelectric conversion unit 101A in more detail.

FIG. 3 illustrates a photodiode PDA provided to detect phase-difference and a photodiode provided to monitor the light quantity. The anode of the photodiode PDA is connected to the input node of an amplifier Amp via a transfer transistor TX, and that of the photodiode PDM is connected to the input node of the amplifier Amp via a transfer transistor MON. FIG. 3 also illustrates a parasitic capacitance Cpd occurring between the photodiode PDA and the transfer transistor TX, and a parasitic capacitance Cmon occurring between the photodiode PDM and the transfer transistor MON. An FD capacitance Cfd which is the capacitance of a floating diffusion unit and a reset transistor RES are connected to the input node of the amplifier Amp. When a signal PTX turns to a high level, the transfer transistor TX is brought into conduction, and electric charges that are accumulated in the capacitance Cpd are transferred to the FD capacitance Cfd. Further, when a signal PMON turns to a high level, the transfer transistor MON is brought into conduction, and electric charges that are accumulated in the capacitance Cmon are transferred to the FD capacitance Cfd. When a signal PRES turns to a high level, the reset transistor RES is brought into conduction, and the input node of the amplifier Amp is reset based on a power voltage VRES. The signals PTX, PMON, and PRES, and a signal PSELx are transmitted from, for example, a timing generation unit (not shown). Here, the photodiodes PDA and PDM respectively correspond to first and second photoelectric conversion units, the transfer transistors TX and MON individually correspond to first and second transfer units, the amplifier Amp corresponds to a pixel output unit, and the reset transistor RES corresponds to a reset unit.

Next, the relationship between the photodiodes PDA and PDM, and the power voltage VRES will be described.

Both the photodiode PDA provided to detect the phase-difference and the monitoring photodiode PDM are reset to the reverse-biased state with the reset transistor RES. At that time, the photodiode PDA is depleted and the photodiode PDM is not depleted. Accordingly, the capacitance value of the capacitance Cpd of the photodiode PDA becomes almost negligible. On the other hand, the capacitance value of the capacitance Cmon is dominantly determined by the parasitic capacitance of a non-depleted photo-receiving unit. Further, the transfer transistors TX and MON, the reset transistor RES, the input node of the amplifier Amp, and a wiring capacitance occurring due to wiring associated therewith contribute to the capacitance Cfd of an FD unit. Usually, the magnitude relationship between the capacitance values is expressed as Cmon>Cfd>Cpd.

Figure 4A:
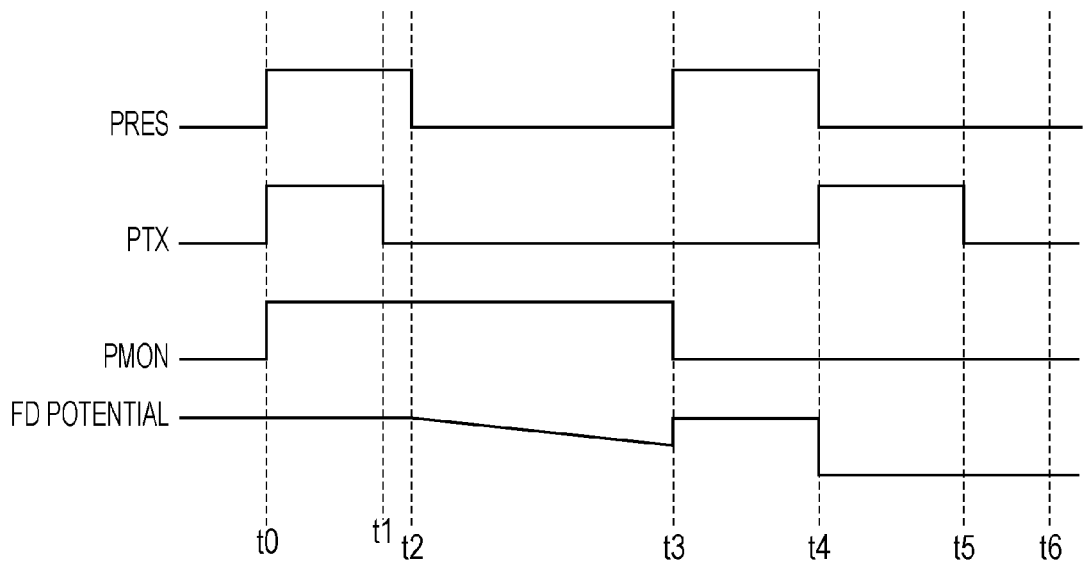
FIG. 4A is a timing chart according to the first embodiment.
Figure 4B:
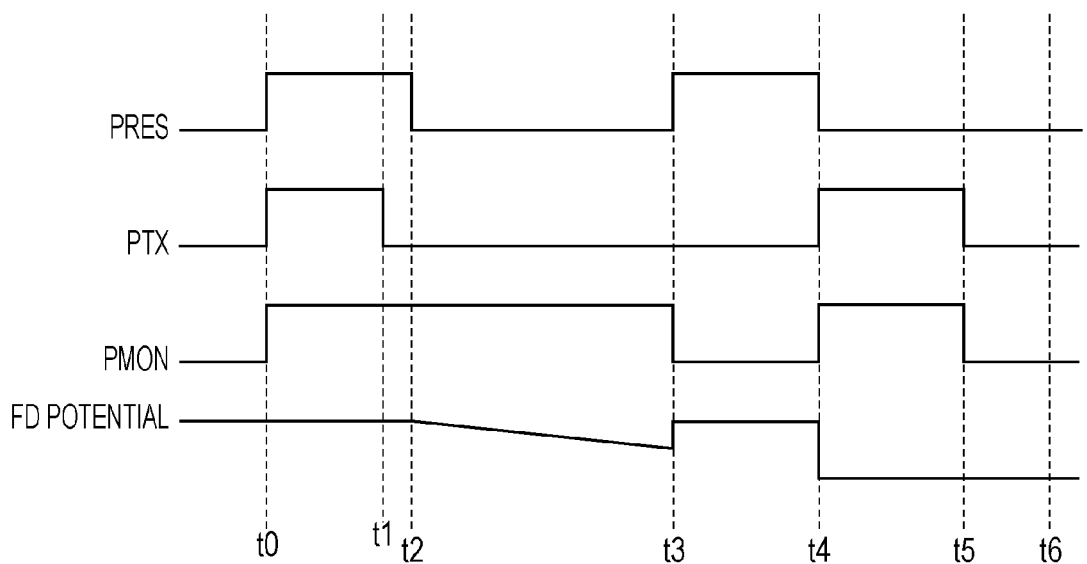
FIG. 4B is another timing chart according to the first embodiment.

Next, operations of the photoelectric conversion device of the present embodiment will be described with reference to FIG. 4A. The operations are valid on the condition that the brightness of an object is low. Each of FIGS. 4A and 4B illustrates the potential (expressed as FD POTENTIAL) of the input node of the amplifier Amp in addition to the signals PRES, PTX, and PMON. Although not shown in FIG. 4A, the signal PSELx is in a high level during the time period illustrated in FIG. 4A. Further, control is performed so that the line-sensor units that are paired with each other operate simultaneously.

First, when the signals PRES, PTX, and PMON turn to high levels at time to, the reset transistor RES, and the transfer transistors TX and MON are brought into conduction in response thereto. Accordingly, the photodiodes PDA and PDM, and the input node of the amplifier Amp are reset based on the power voltage VRES.

When the signal PTX turns to a low level at time t1, the transfer transistor TX is turned off so that the photodiode PDA enters the charge-accumulation state. Since the reset transistor RES is conducting at that time, the FD potential is not changed.

When the signal PRES turns to a low level at time t2, the reset transistor RES is turned off, and the reset state of the photodiode PDM is cancelled. From that point, the FD potential changes due to electric charges generated by the photodiode PDM.

When a time elapses from time t2 and the value of the P-B signal detected with the monitoring unit 30 exceeds a predetermined threshold value (time t3), the signal PRES turns to a high level and the signal PMON turns to a low level. Consequently, the connection between the photodiode PDM and the input node of the amplifier Amp is interrupted, and the FD potential is reset based on the power voltage VRES.

During the time period between time t4 and time t5, the signal PTX turns to a high level and electric charges that are accumulated in the phase-difference detection photodiode PDA are transferred to the FD capacitance Cfd. Thus, control of the accumulation time of the phase-difference detection photodiode PDA is finished.

From time t6, outputs from each of the maximum-value detection units are sequentially transmitted from a scanning circuit (not shown) to the output buffer Buf so that an individual signal is obtained for each of unit pixels.

According to the above-described operations, the transfer transistor MON is turned off at time t3, and the electric charges that are accumulated in the photodiode PDA are transferred to the FD capacitance Cfd. Therefore, only the FD capacitance Cfd is associated with the input node of the amplifier Amp at the phase-difference detection time, so that a charge-voltage conversion coefficient is increased. In other words, it becomes possible to increase the range which the electric charges can be detected as voltage signals even if only a small number of electric charges are generated in the photodiode PDA. Therefore, a low-brightness object can be easily brought into focus.

Next, operations of the photoelectric conversion device of the present embodiment will be described with reference to FIG. 4B. The operations are valid on the condition that the brightness of the object is high. The operations are different from those illustrated in FIG. 4A in that the signal PMON turns to a high level during the time period between time t4 and time t5, and the monitoring photodiode PDM is electrically connected to the FD unit.

According to the operations, a capacitance which is associated with the input node of the amplifier Amp when the electric charges that are accumulated in the photodiode PDA are transferred to the FD capacitance Cfd includes the FD capacitance Cfd and the capacitance Cmon of the photodiode PDM, so that the charge-voltage conversion coefficient is decreased. Consequently, it becomes possible to increase the range where the electric charges can be detected as voltage signals without saturation even when the brightness of the object is high.

According to the present embodiment, the photodiode PDA is depleted and the photodiode PDM is not fully depleted at the reset time. Therefore, the charge-voltage conversion coefficient can be increased based on the capacitance Cpd having a low capacitance value when the brightness is low. Further, the charge/voltage conversion coefficient can be decreased with additional capacitance Cmon having a high capacitance value when the brightness is high, which is adaptable to a wide brightness range. Particularly, an increased sensitivity can also be achieved when the brightness is low, because the photodiode PDA has a small capacitance value.

The operations that are illustrated in FIG. 4A are determined to be first mode and those illustrated in FIG. 4B are determined to be second mode, and switching between the first mode and the second mode based on the brightness of the object allows for increasing the brightness range where the voltage signals can be detected with precision, that is, a dynamic range.

Next, the level where the charge-accumulation operation of the unit pixel is finished, the level being determined with the monitoring unit 30, will be described.

When a gain applied to a signal during the time period from when the signal is output from the unit pixel to when the signal is input to the monitoring unit 30 is expressed as G, a signal input to the monitoring unit 30 at low brightness, that is, at the high-gain, is expressed as Vhigh, and a signal input to the monitoring unit 30 at high brightness, that is, at the low-gain, is expressed as Vlow, the gain and the signals are illustrated as below. Here, the sign Qpd denotes the amount of electric charge generated by the photodiode PDA, and the sign Qmon denotes the amount of electric charge generated by the photodiode PDM.

At low brightness:

$$Vhigh = G \times \frac{Qpd}{Cfd + Cpd} \quad \text{Equation (1)}$$

At high brightness:

$$Vlow = G \times \frac{Qpd + Qmon}{Cmon + Cfd + Cpd} \quad \text{Equation (2)}$$

As is clear from Equations (1) and (2), the signal amplitude attained at low brightness is different from that attained at high brightness. However, the amplitude of a signal input to the monitoring unit 30 is to fall within a given amplitude range irrespective of the condition of the object. When a desired value of the amplitude is expressed as Vtarget and a signal input to the monitoring unit 30 at given time t is expressed as Vagc(t), the relationship between the value Vtarget and the signal Vagc (t) is expressed as below.

At low brightness:

$$Vtarget \times \frac{Vhigh}{Vagc} = \frac{Qpd}{Qmon} \times \frac{Cmon + Cfd}{Cfd + Cpd} \quad \text{Equation (3)}$$

At high brightness:

$$Vtarget \times \frac{Vlow}{Vagc} = \frac{Qpd + Qmon}{Qmon} \times \frac{Cmon + Cfd}{Cmon + Cfd + Cpd} \quad \text{Equation (4)}$$

Figure 5:
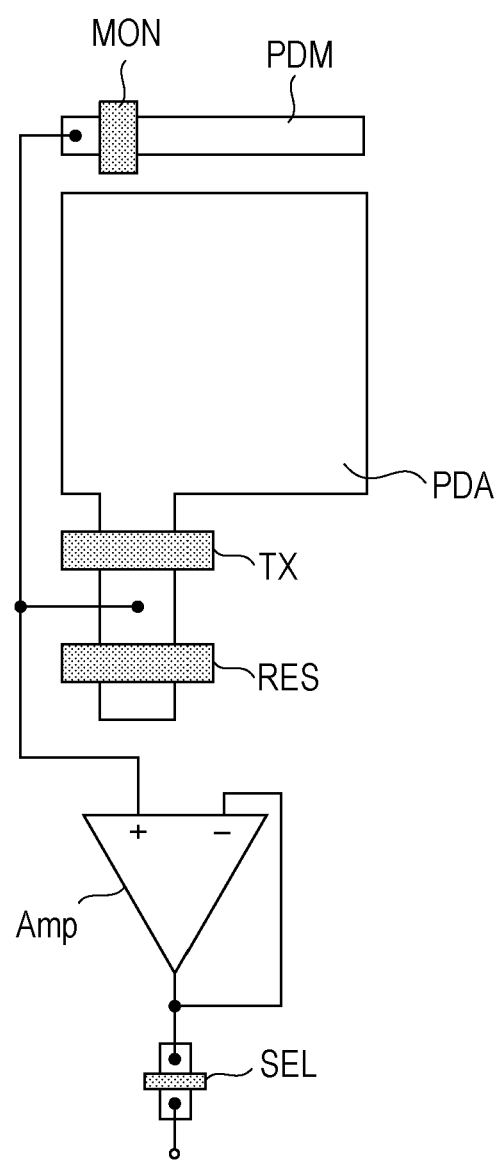
FIG. 5 is a planar layout of the unit pixel according to the first embodiment.

Next, an exemplary planar layout illustrating how the unit pixel of the present embodiment is provided on a semiconductor substrate is shown in FIG. 5. Here, a voltage follower including an operational amplifier is exemplarily provided as the amplifier Amp.

As is clear from FIG. 5, the repeat direction in which the unit pixels 11A, 12A, and so forth are arranged is determined to be a first direction, and the photodiode PDA and the photodiode PDM are arranged in a second direction perpendicular to the first direction. When the photodiode PDA and the photodiode PDM of the unit pixel are arranged along the first direction in the AF-photoelectric conversion device, it becomes difficult to adapt to the pixel-pitch reduction. Further, the monitoring operation is performed through the use of beams of light, which are incident from different positions with reference to the first direction, in the same unit pixel. Therefore, the monitoring operation may be performed with insufficient precision.

On the other hand, when the photodiode PDA and the photodiode PDM are laid out as illustrated in FIG. 5, the monitoring operation can be performed through the use of beams of light, which are incident from the same position with reference to the first direction. The above-described configuration is not only adaptable to the pixel-pitch reduction, but also capable of increasing the precision of the monitoring operation.

Further, the photodiode PDA is designed to have a photo-receiving area greater than that of the photodiode PDM, so as to increase the amount of electric charge generated by the photodiode PDA, where the electric charge is used as the phase-difference.

Second Embodiment

A second embodiment of the present invention will be described below. The second embodiment is exemplarily applied for a photoelectric conversion device performing the phase-difference AF. The second embodiment is different from the first embodiment in that the transfer transistor MON is not provided between the monitoring photodiode PDM and the FD unit. Upon being reset based on the power voltage VRES, however, the photodiode PDA is depleted and the photodiode PDM is not fully depleted, as is the case with the first embodiment.

Figure 6:
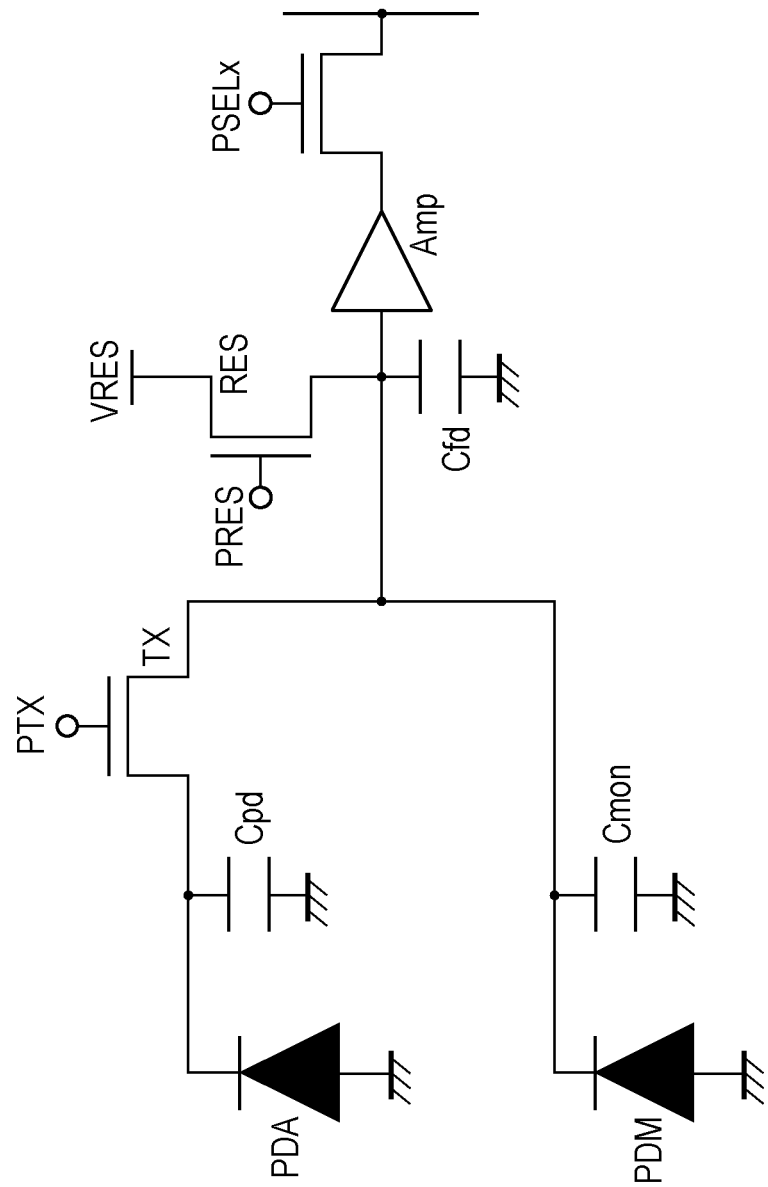
FIG. 6 is an equivalent circuit diagram of a unit pixel according to a second embodiment of the present invention.
Figure 7:
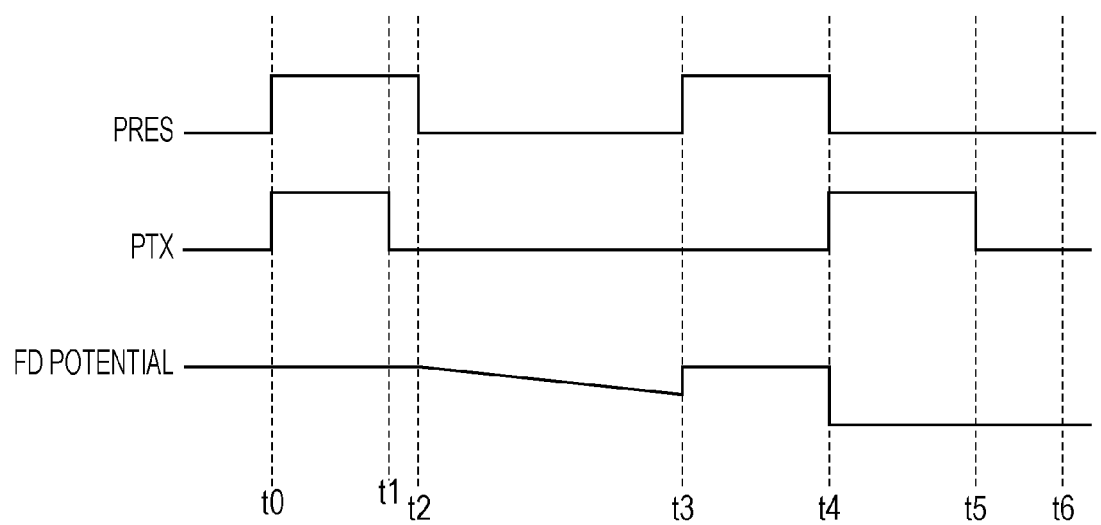
FIG. 7 is a timing chart according to the second embodiment.

FIG. 6 is an equivalent circuit diagram which is achieved according to the present embodiment. The same components as those of FIG. 3 are designated by the same reference numerals. FIG. 7 is a timing chart illustrating operations that are performed according to the present embodiment. Although not shown in FIG. 7, the signal PSELx is in a high level during the time period. Further, control is performed so that the line-sensor units that are paired with each other operate simultaneously.

When the signals PRES and PTX turn to high levels at time t0, the reset transistor RES and the transfer transistor TX are turned on in response thereto. Accordingly, the photodiodes PDA and PDM, and the input node of the amplifier Amp are reset based on the power voltage VRES.

When the signal PTX turns to a low level at time t1, the reset transistor RES is turned off in response thereto, and the photodiode PDA enters the charge-accumulation state. Since the reset transistor RES is turned on at that time, the FD potential and the potential of the monitoring photodiode PDM are not changed.

When the signal PRES turns to a low level at time t2, the reset transistor RES is turned off, and the reset state of the photodiode PDM is cancelled. From that point, the FD potential is changed due to electric charge generated by the photodiode PDM.

When a time elapses from time t2 and the value of the P-B signal detected with the monitoring unit 30 exceeds a predetermined threshold value (time t3), the signal PRES turns to a high level, and the input node of the amplifier Amp and the photodiode PDM are reset based on the power voltage VRES.

After the signal PRES's being changed to a low level at time t4, the signal PTX turns to a high level during the time period between time t4 and time t5. Accordingly, electric charge accumulated in the phase-difference detection photodiode PDA is transferred to the FD capacitance Cfd. Thus, the accumulation time of the photodiode PDA is finished.

From time t6, outputs from each of the maximum-value detection units are sequentially transmitted from a scanning circuit (not shown) to the output buffer Buf so that an individual signal is obtained for each of unit pixels.

Since the FD unit is electrically connected to the photodiode PDM at all times in the present embodiment, the charge/voltage conversion is performed for the capacitance Cmon in addition to the capacitance Cfd.

Thus, the phase-difference detection photodiode PDA is electrically disconnected from the FD capacitance with the transfer transistor during the accumulation period. Therefore, the phase-difference detection photodiode PDA is not affected by a dark current occurring in the FD capacitance during the accumulation period. Consequently, information can be read with high precision. Further, the omission of the transfer transistor MON allows for increasing the area of the photo-receiving unit and achieving an increased sensitivity. Still further, the unit pixels are easily controlled.

Figure 8:
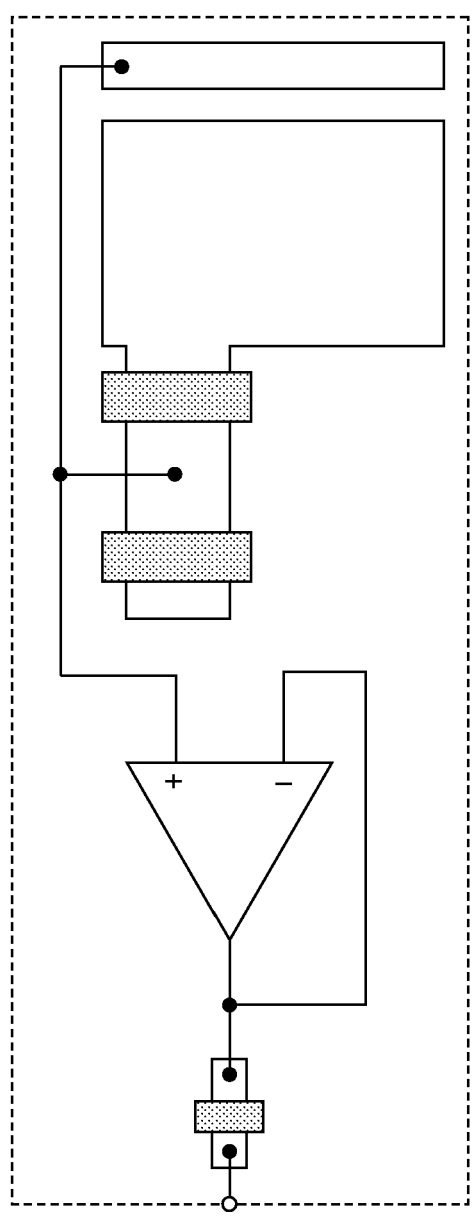
FIG. 8 is a planar layout of the unit pixel according to the second embodiment.

FIG. 8 shows an exemplary planar layout illustrating how the unit pixel of the present embodiment is provided on a semiconductor substrate.

As is clear from FIG. 8, the repeat direction in which the unit pixels 11A, 12A, and so forth are arranged is determined to be a first direction, and the photodiodes PDA and PDM are arranged in a second direction perpendicular to the first direction. According to the above-described layout, the monitoring operation can be performed through the use of beams of light, which are incident from the same position with reference to the first direction. The above-described configuration not only realizes the pixel pitch reduction, but also enables increasing the precision of the monitoring operation.

Third Embodiment

Next, a third embodiment of the present invention will be described.

In the present embodiment, an offset cancellation circuit is provided as a noise-reduction circuit in addition to the components of the first embodiment. FIG. 9A is a schematic circuit diagram illustrating one of the pixels of the line-sensor unit L1A. For simplification's sake, a selection switch SEL is omitted from the components of the unit pixel, which are illustrated in FIG. 3. A timing generator 19 outputs signals PTX, PMON, and PRES, signals PSEL, PAGC, and so forth to control the operations of the photoelectric conversion device.

FIG. 9A illustrates an offset cancellation circuit OC1 provided for the minimum-value detection unit and an offset cancellation circuit OC2 provided for the maximum-value detection unit.

The minimum-value detection unit includes a differential amplifier BA and a switch, and an output from the differential amplifier BA is fed back to the offset cancellation circuit OC1. The outputs of the minimum-value detection units are commonly connected to a signal line 9 and a signal output to a terminal BOUT is transmitted to the monitoring unit 30. Further, the switches of the minimum-value detection units are controlled based on the signal PAGC shared therebetween.

FIG. 9B illustrates an exemplary configuration of the differential amplifier BA of the minimum-value detection unit. The differential amplifier BA includes a differential amplifier and a source-follower output stage. A signal BP2 is a signal, input from an external, used to control a current passing through a differential input stage. A signal BP3 is used to control the constant current source of the source-follower output stage.

A transistor 11 connected to the signal line 9 functions as the constant current source of the source-follower output stage when the switch of the minimum-value detection unit is turned on based on the signal PAGC.

FIG. 9C illustrates the configuration of a differential amplifier PA of the minimum-value detection unit. The differential amplifier PA is different from the differential amplifier BA in that the polarity of a source-follower output stage is the reverse of that of the source-follower output stage of the differential amplifier BA.

The maximum-value detection unit includes a differential amplifier PA and a switch, and an output from the differential amplifier PA is fed back to the offset cancellation circuit OC2. The outputs of the maximum-value detection units are commonly connected to a signal line 10 and a signal output to a terminal POUT is transmitted to the monitoring unit 30. A signal BP1 is a signal provided from an external to control a current passing through a differential input stage. A signal BN1 is provided to control the constant current source of the source-follower output stage.

The switches of the maximum-value detection units, which are controlled based on the signal PAGC shared therebetween, can also be controlled based on signals PH1, PH2, and so forth that are output from the scanning circuit. Therefore, it becomes possible to read signals individually, the signals being output from the unit pixels.

A transistor 12 connected to the signal line 10 functions as the constant current source of the source-follower output stage when the switch of the maximum-value detection unit is turned on based on the signal PAGC.

The monitoring unit 30 includes a differential amplifier 15 and a comparator 17. The inverting input terminal and the non-inverting input terminal of the differential amplifier 15 are connected to the individual signal lines 9 and 10. That is, when the minimum-value detection unit and the maximum-value detection unit are connected to the individual signal lines based on the signal PAGC at the same time, the difference between the maximum value and the minimum value of the line-sensor unit L1A, that is, the P-B signal is output. At the time when the result of comparison between the P-B signal and a reference signal VREF is inverted, the timing generator 19 finishes the charge-accumulation operation of each unit pixel.

Figure 10:
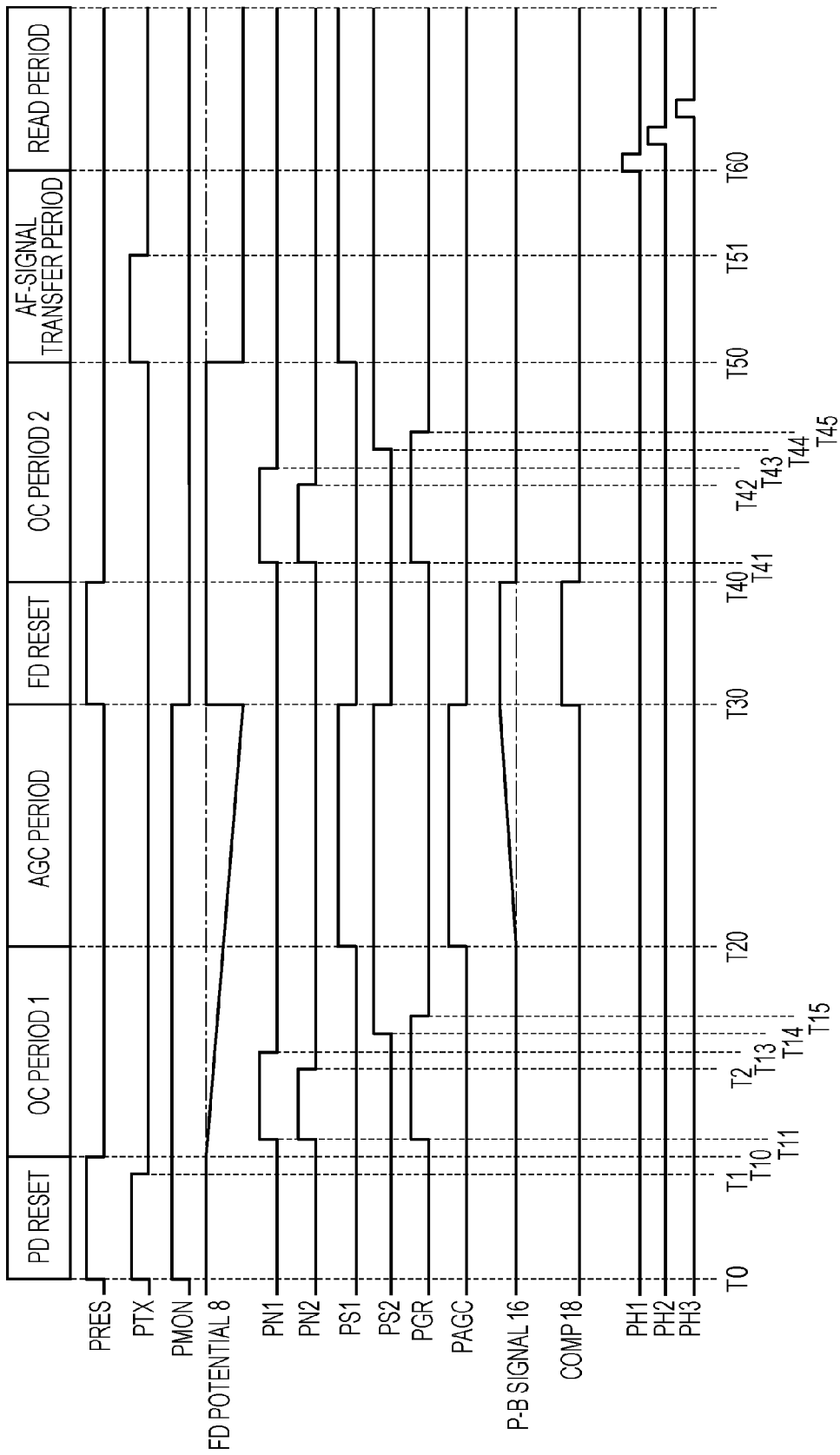
FIG. 10 is a timing chart according to the third embodiment.

Next, operations of the photoelectric conversion device of the present embodiment will be described with reference to FIG. 10. The same operations as those of the first embodiment will be omitted.

The photodiode-reset operations that are performed during the PD reset period between time T0 to time T10 are the same as the operations of the first embodiment. During the PD reset period, signals PN1, PN2, PS1, PS2, and PGR, and the signal PAGC that are related to the offset cancellation circuits OC1 and OC2 turn to low levels.

An offset cancellation (OC) period 1 is included in the period where electric charge is accumulated in the phase-difference detection photodiode PDA. When the signals PN1, PN2, and PGR turn to high levels at time T11, switches 21, 23, and 25 are turned on. Accordingly, a signal output from the unit pixel is transmitted to the differential amplifier BA via the switch 21 and a signal output from the differential amplifier BA is transmitted to one of the terminals of a clamp capacitance 24 via the switch 23. The transmitted signal includes the offset of the differential amplifier BA.

From time T12, the signals PN2 and PN1 turn to low levels in sequence, and the switches 23 and 21 are individually turned off.

When the signal PS2 turns to a high level at time T14, a switch 28 is turned on and the node of the non-inverting input terminal of the differential amplifier BA is reset based on a clamp voltage VGP.

When the signal PGR turns to a low level at time T15, the other terminal of the clamp capacitance 24, that is, the node of the non-inverting input terminal of the differential amplifier BA is electrically floated. Consequently, the clamp capacitance holds the potential difference between a voltage including the signal output from the unit pixel and the offset of the differential amplifier BA, and the clamp voltage.

During an AGC period starting from time T20, the signals PS1 and PAGC turn to high levels. At that time, a signal output from the unit pixel is transmitted to one of the terminals of the clamp capacitance 24 via the switch 22. That is, only the signal corresponding to potential variations occurring from a level clamped at time T15 is transmitted to the differential amplifier BA. By being transmitted via the differential amplifier BA, the signal output from the differential amplifier BA does not include the offset of the differential amplifier BA.

When a time elapses from time t20 and the logic level of a signal COMP18 output from the monitoring unit 30 is inverted at time T30, the AGC period is finished. During an FD reset period starting from time T30, the monitoring unit 30 resets the FD capacitance Cfd by making the level of the signal PRES high, and electrically disconnects the monitoring photodiode PDM from the FD capacitance Cfd by making the level of the signal PMON low in response to the inversion of the signal COMP18. Further, the monitoring unit 30 makes the levels of the signals PS1, PS2, and PAGC low.

At time T40, the signal PRES turns to a low level and the reset state of the input node of the amplifier Amp is cancelled. The operations that are performed during the OC period 2 between time T40 and time T50 are the same as those performed during the OC period 1 except that the level of the signal PMON is low. That is, the offset cancellation operations are performed in the state where the monitoring photodiode PDM is electrically disconnected from the input node of the amplifier Amp during that period.

An AF-signal transfer period starts from time T50, and the signal PTX turns to a high level. Accordingly, electric charge that is accumulated in the phase-difference detection photodiode PDA is transferred to the FD capacitance Cfd. Since the levels of the signals PS1 and PS2 are high, a noise occurring in the unit pixel and a signal including the decreased offset of the differential amplifier BA are output from the differential amplifier BA, as is the case with the offset cancellation circuit OC2 and the maximum-value detection unit.

During a read period starting from time T60, the signals PH1, PH2, PH3, and so forth are output from the scanning circuit in sequence, and signals that are generated based on the signals accumulated in the phase-difference detection photodiode PDA are output from the output terminal POUT in sequence.

The present embodiment can also achieve the benefits that are obtained through the configurations of the first embodiment. Further, the present embodiment can reduce the noise occurring in the unit pixel and the offset occurring in each of the maximum-value detection unit and the minimum-value detection unit. Therefore, a signal can be detected with increased precision.

Fourth Embodiment

Figure 11:
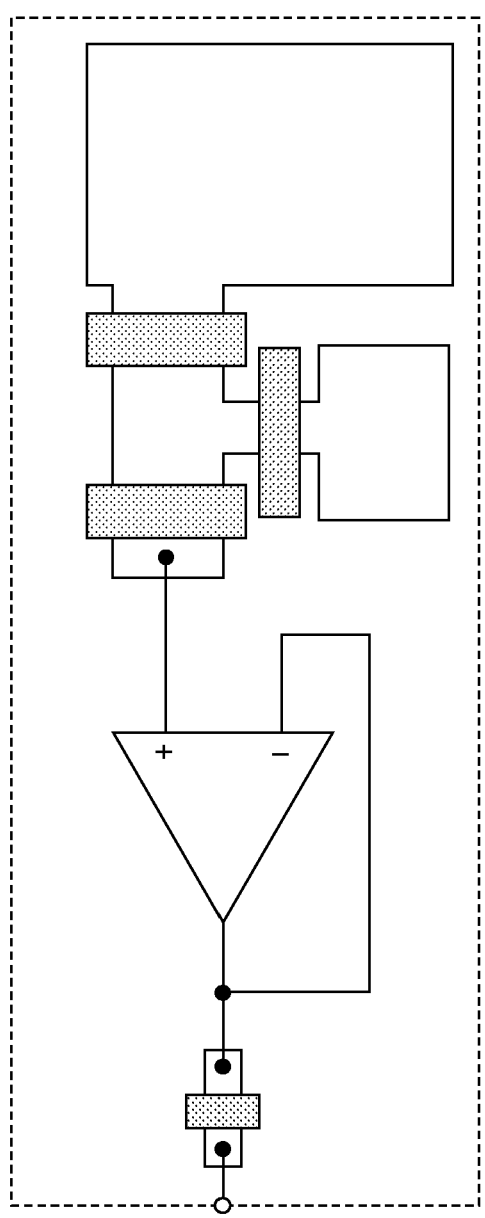
FIG. 11 is a planar layout of a unit pixel according to a fourth embodiment of the present invention.

Next, an exemplary planar layout illustrating how a unit pixel according to a fourth embodiment of the present invention is provided on a semiconductor substrate is shown in FIG. 11.

In the present embodiment, the monitoring photodiode PDM is directly connected to the FD unit. FIG. 11 is different from FIG. 8 in that the monitoring photodiode PDM is provided at a position nearer to the FD unit than that of the monitoring photodiode PDM shown in FIG. 8.

Here, the photodiode PDM and the FD unit are connected to each other with a continuous diffusion layer. However, the photodiode PDM and the FD unit may be provided on diffusion layers that are different from each other, and connected to each other with wiring. In the above-described configuration, the length of wiring becomes smaller than that of wiring illustrated in the layout of FIG. 8. Consequently, the capacitance value associated with the FD unit can be reduced and an increased sensitivity can be obtained.

Fifth Embodiment

Figure 12:
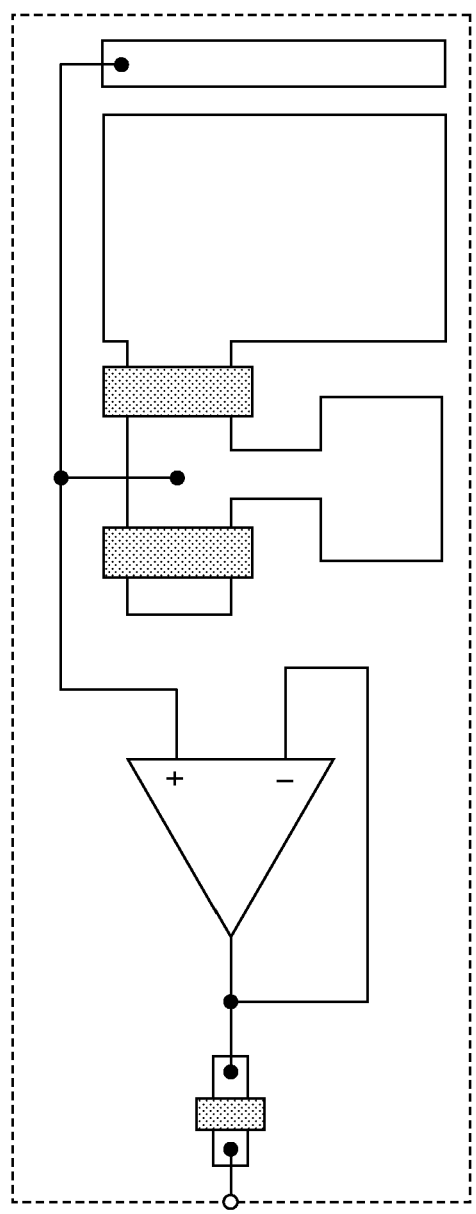
FIG. 12 is a planar layout of a unit pixel according to a fifth embodiment of the present invention.

Next, an exemplary planar layout illustrating how a unit pixel according to a fifth embodiment of the present invention is provided on a semiconductor substrate is shown in FIG. 12.

In the present embodiment, monitoring photodiodes PDMA and PDMB are directly connected to the FD unit.

According to the configurations that are illustrated in FIGS. 8 and 11, the monitoring photodiode is provided on only one side of the photodiode PDA along the second direction. In the present embodiment, a plurality of photoelectric conversion regions of the monitoring photodiode is provided so that the photodiode PDA is sandwiched therebetween along the second direction. Therefore, it becomes possible to perform the monitoring operations with precision and control the accumulation time even though the brightness distribution of the object extends along the second direction.

Sixth Embodiment

Figure 13:
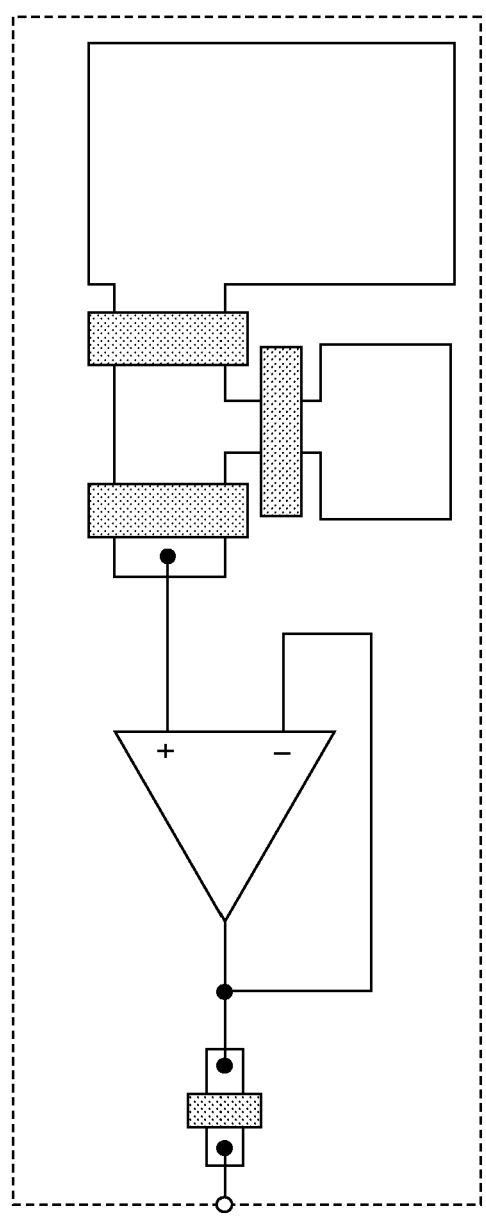
FIG. 13 is a planar layout of a unit pixel according to a sixth embodiment of the present invention.

FIG. 13 illustrates an exemplary planar layout illustrating how a unit pixel according to a sixth embodiment of the present invention is provided on a semiconductor substrate.

As compared with the layout illustrated in FIG. 5, the photodiode PDM is nearer to the FD unit in the present embodiment. Therefore, the length of wiring connecting the photodiode PDM to the FD unit can be reduced. Accordingly, the value of capacitance connected to the input node of the amplifier Amp can be reduced, which achieves an increased sensitivity.

Seventh Embodiment

Figure 14:
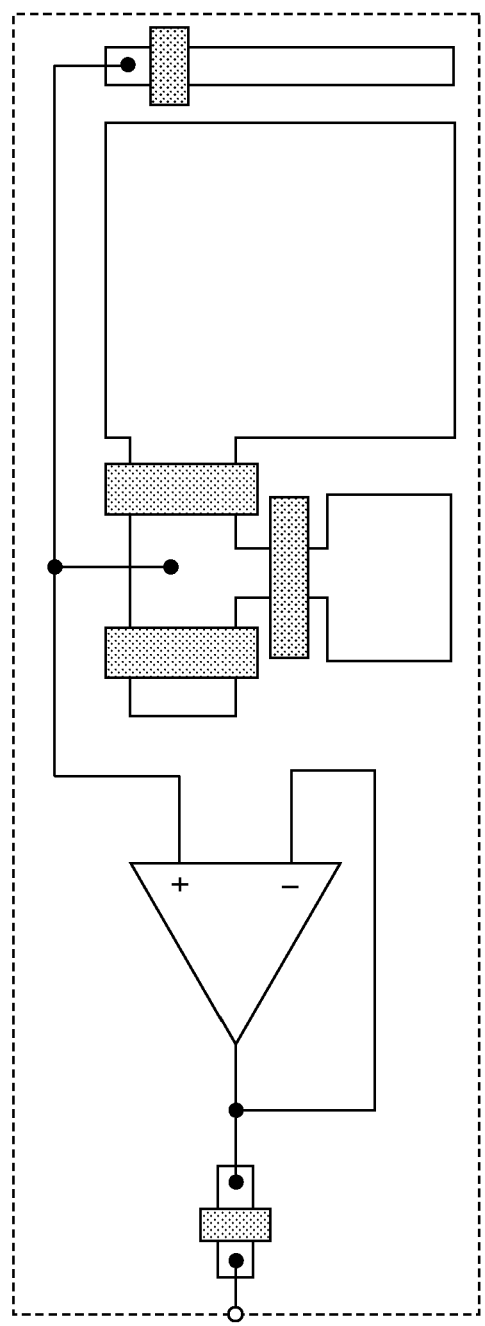
FIG. 14 is a planar layout of a unit pixel according to a seventh embodiment of the present invention.

Next, an exemplary planar layout illustrating how a unit pixel according to a seventh embodiment of the present invention is provided on a semiconductor substrate is shown in FIG. 14.

In the present embodiment, two photoelectric conversion regions of the monitoring photodiode are provided so that the photodiode PDA is sandwiched therebetween along the second direction, as is the case with the configuration illustrated in FIG. 12.

Therefore, it becomes possible to control the accumulation time with precision even though the brightness distribution extends along the second direction, as is the case with the fifth embodiment. Additionally, since the monitoring photodiodes are connected to the FD unit via individual switches, the charge/voltage conversion coefficient can be changed based on the brightness of the object, as is the case with the first embodiment.

Eighth Embodiment

Figure 15:
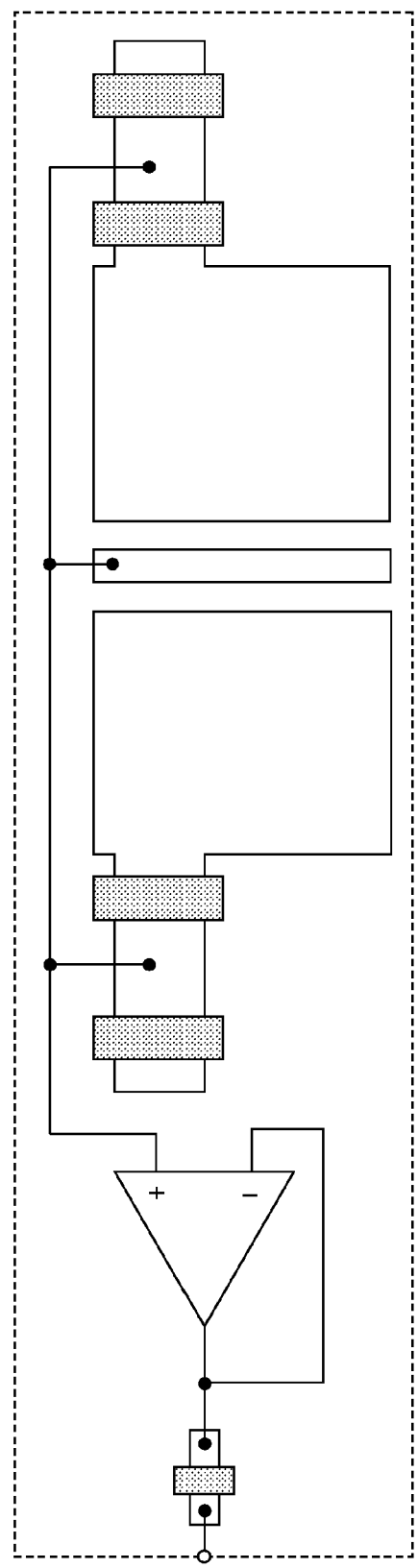
FIG. 15 is a planar layout of a unit pixel according to an eighth embodiment of the present invention.

FIG. 15 illustrates an exemplary planar layout illustrating how a unit pixel according to an eighth embodiment of the present invention is provided on a semiconductor substrate.

In the present embodiment, two photoelectric conversion regions are provided as phase-difference detection photodiodes PDA1 and PDA2, and the monitoring photodiode PDM is provided therebetween. Accordingly, even though the object's brightness of the photodiode PDA1 is significantly different from that of the photodiode PDA2, the monitoring photodiode PDM provided between the photodiodes PDA1 and PDA2 can control the accumulation time with precision.

Ninth Embodiment

Figure 16:
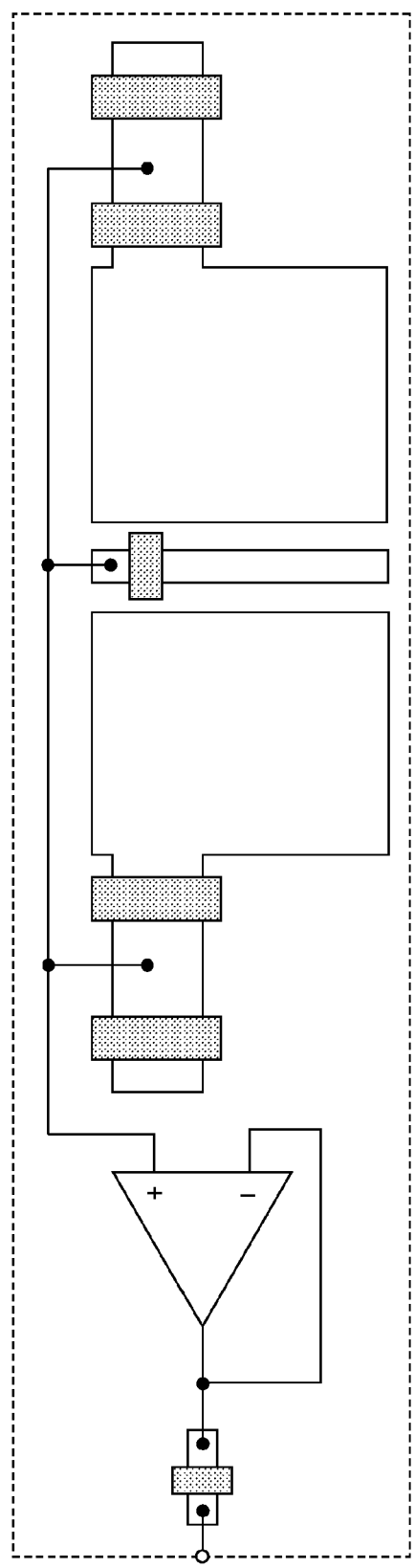
FIG. 16 is a planar layout of a unit pixel according to a ninth embodiment of the present invention.

FIG. 16 illustrates an exemplary planar layout illustrating how a unit pixel according to a ninth embodiment of the present invention is provided on a semiconductor substrate.

In the present embodiment, two photoelectric conversion regions are provided as the phase-difference detection photodiodes PDA1 and PDA2, and the monitoring photodiode PDM is provided therebetween. Accordingly, even though the object's brightness of the photodiode PDA1 is significantly different from that of the photodiode PDA2, the monitoring photodiode PDM provided between the photodiodes PDA1 and PDA2 can control the accumulation time with precision.

Tenth Embodiment

Figure 17:
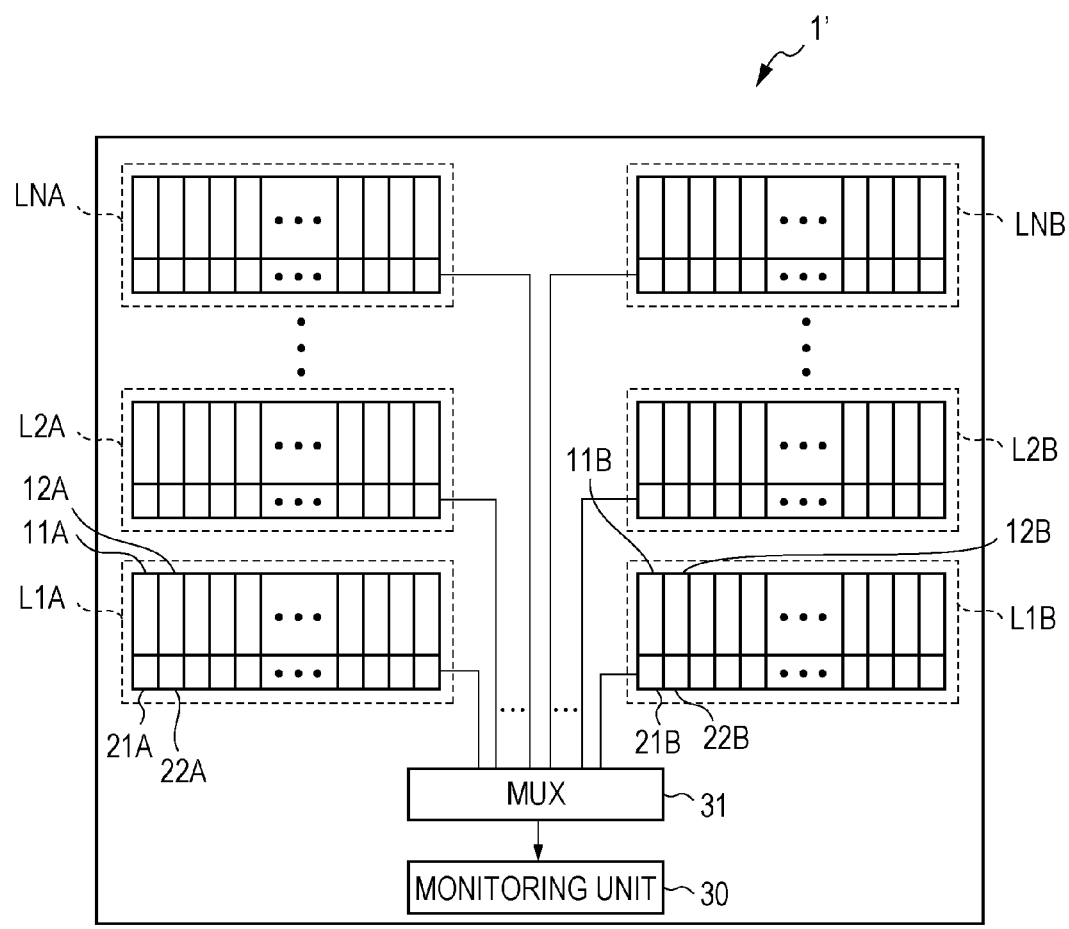
FIG. 17 illustrates the main components of an AF-photoelectric conversion device according to a tenth embodiment of the present invention.

FIG. 17 schematically illustrates the main components of a phase-difference AF-photoelectric conversion device 1' according to a tenth embodiment of the present invention. The present embodiment will be described with emphasis on the difference between the above-described photoelectric conversion device and the photoelectric-conversion device illustrated in the first embodiment.

The photoelectric conversion device 1' includes pairs of line-sensor units L1A and L1B, line-sensor units L2A and L2B, . . . , and line-sensor units LNA and LNB. A pair of the line-sensor units is used to measure the defocusing amount of a subject, which is attained in a given region of an imaging area. A plurality of range-finding points is provided by arranging two or more pairs of the line-sensor units so that the AF precision is increased. Each of the line-sensor units includes unit pixels 11A, 12A, and so forth, each having an AF photoelectric conversion unit configured to detect phase-difference and a monitoring photoelectric conversion unit configured to monitor the light quantity. Signal output units 21A and 22A, . . . , and 21B and 22B are individually provided in the unit pixels of the line-sensor units L1A, L2A, . . . , LNA, and L1B, L2B, . . . , LNB. The unit pixels output signals to, for example, an MUX 31 via the individual signal output units 21A, 22A, . . . , and 21B and 22B so that the MUX 31 selects and outputs a signal to the monitoring unit 30.

Figure 18:
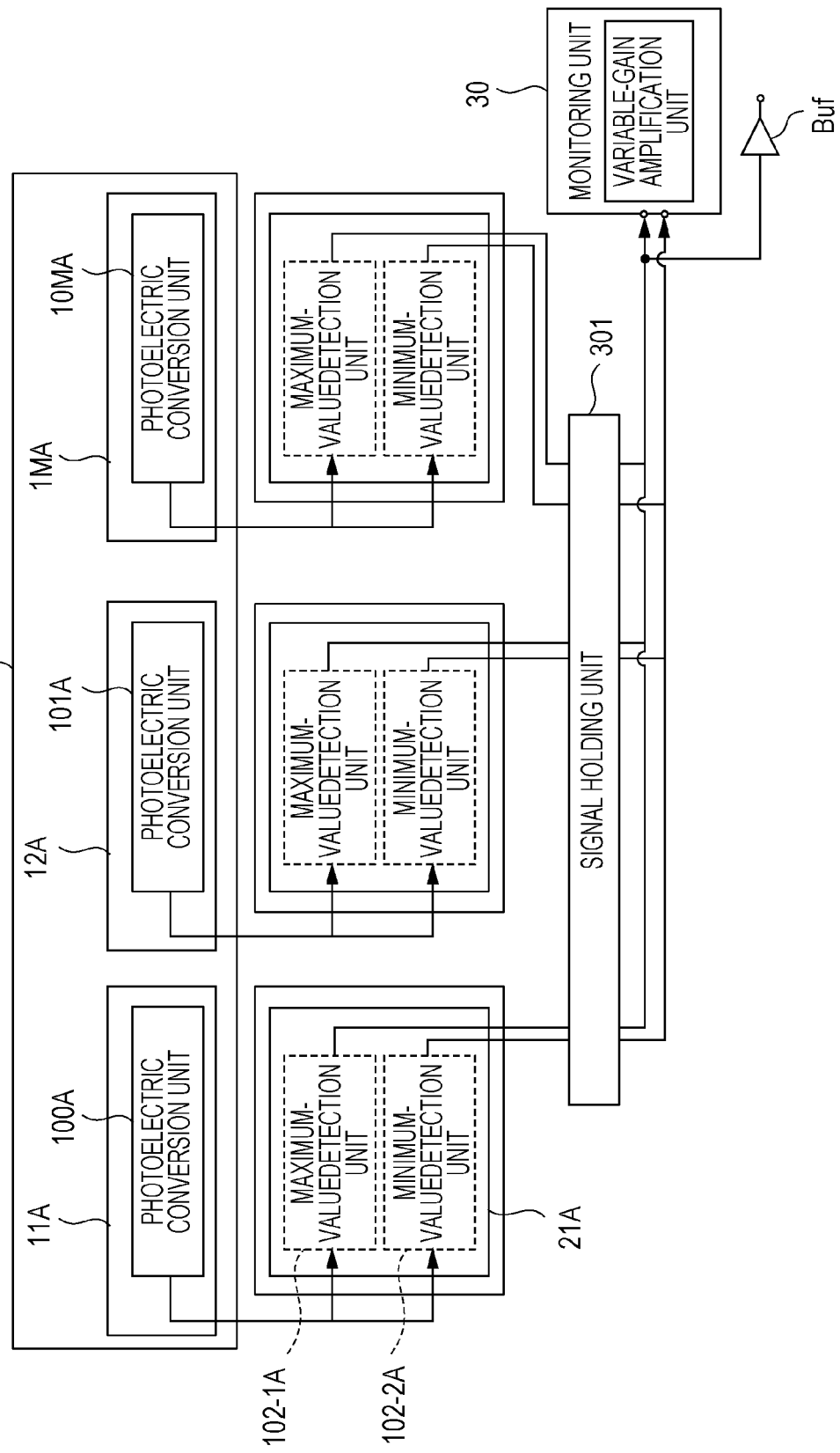
FIG. 18 illustrates the main components of a line-sensor unit according to the tenth embodiment.

FIG. 18 illustrates a part relating to the line-sensor unit L1A in more detail. The unit pixel 11A includes the photoelectric conversion unit 100A, and the signal output unit 21A includes the maximum-value detection unit 102-1A and the minimum-value detection unit 102-2A. A signal output from the photoelectric conversion unit is transmitted to each of the maximum-value detection unit 102-1A and the minimum-value detection unit 102-2A via a signal-holding unit. The maximum-value detection unit 102-1A and the minimum-value detection unit 102-2A are provided as, for example, source-follower amplifiers. Additionally, the unit pixel 11A may include a noise-reduction circuit to increase the signal-detection precision. Each of other unit pixels has the same configuration as that of the unit pixel 11A. Since each of the line-sensor units L2A, L3A, and so forth, and L1B, L2B, and so forth has the same configuration as that of the line-sensor unit L1A, the description thereof will be omitted.

When the configurations of the above-described embodiments are applied to the above-described photoelectric-conversion device of the present embodiment, the same benefits as those of the above-described embodiments can be achieved.

Eleventh Embodiment

Figure 19:
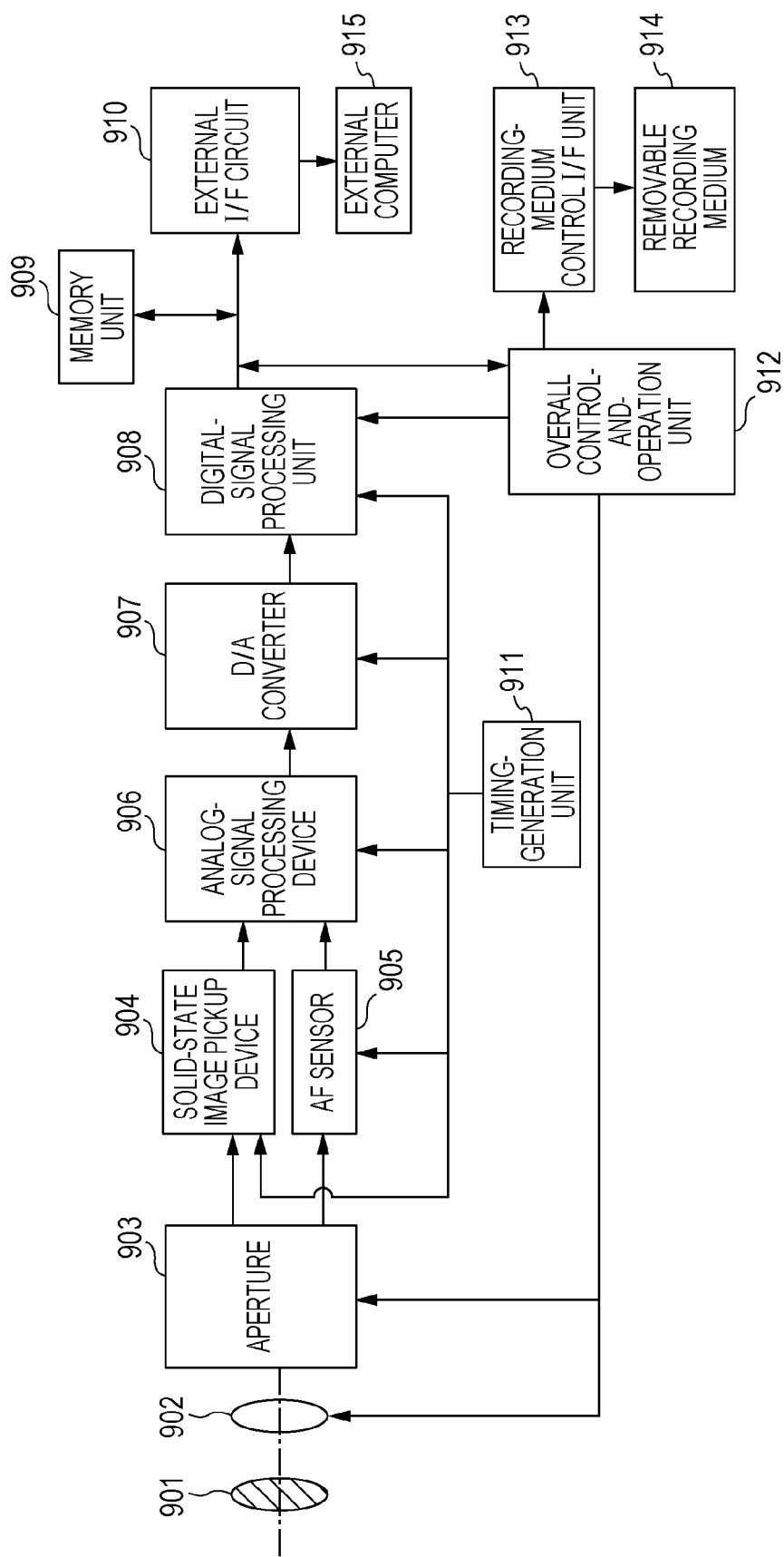
FIG. 19 is a block diagram illustrating the configuration of an image pickup system according to an eleventh embodiment of the present invention.

FIG. 19 is a block diagram illustrating an exemplary configuration of an image-pickup system according to an eleventh embodiment of the present invention.

A barrier 901 configured to protect a lens that will be described later, a lens 902 configured to form an optical image of the object onto a solid-state image pickup device 904, and an aperture 903 configured to adjust the quantity of light passed through the lens 902 are provided. The solid-state image pickup device 904 acquires the optical image of the object as an image signal, the optical image being formed with the lens 902. An AF sensor 905 including the photoelectric-conversion device according to any of the above-described embodiments is also provided.

Further, an analog-signal processing device 906 configured to process a signal output from the solid-state image pickup device 904 or the AF sensor 905, an analog-to-digital (A/D) converter 907 configured to perform A/D conversion for a signal output from the analog-signal processing device 906, and a digital-signal processing unit 908 configured to perform various corrections or compress image data output from the A/D converter 90 are provided.

Still further, a memory unit 909 configured to temporarily store the image data, an external I/F circuit 910 configured to communicate with an external computer or the like, a timing-generation unit 911 configured to output various timing signals to the digital-signal processing unit 908 or the like, an overall control-and-operation unit 912 configured to perform various operations and control the entire camera, a recording-medium control I/F unit 913, a removable recording medium 914 including, for example, a semiconductor memory configured to record or read acquired image data, and an external computer 915 are provided.

Next, operations of the above-described image pickup system, which are performed at the imaging time, will be described. The barrier 901 is opened, and the overall control-and-operation unit 912 calculates the distance between the image pickup system and the object through the above-described phase-difference detection based on a signal output from the AF sensor 905. After that, the overall control-and-operation unit 912 drives the lens 902 based on the calculation result, and determines whether or not the object is brought into focus again. When it is determined that the object is not brought into focus, the overall control-and-operation unit 912 performs autofocus control to drive the lens 902 again. After determining that the object is brought into focus, the solid-state image pickup device 904 starts performing a charge-accumulation operation. After the charge-accumulation operation is finished, an image signal output from the solid-state image pickup device 904 is subjected to A/D conversion with the A/D converter 907 and written into the memory unit 909 through overall control-and-operation via the digital-signal processing unit 908. Then, data accumulated in the memory unit 909 is recorded onto the recording medium 914 via the recording-medium control I/F unit 913 under the control of the overall control-and-operation unit 912. In another case, the data may be directly input to a computer or the like via the external I/F unit 910.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191315 filed on Aug. 27, 2010, which is hereby incorporated by reference herein in its entirety.

What is claimed is:

1. A photoelectric conversion device comprising:
a plurality of unit pixels, each having a first photoelectric conversion unit, a second photoelectric conversion unit, a pixel output unit for outputting a signal based on an amount of electric charge generated by at least one of the first and second photoelectric conversion units, and a first transfer unit for transferring electric charge generated by the first photoelectric conversion unit to the pixel output unit; and
a monitoring unit for controlling a charge-accumulation operation of the first photoelectric conversion unit based on a signal output from the pixel output unit, the signal being generated based on an amount of electric charge generated by the second photoelectric conversion unit;
wherein the photoelectric conversion device maintains an electrical connection of the second photoelectric conversion unit and the pixel output unit during the charge-accumulation operation of the first photoelectric conversion unit.

2. The photoelectric conversion device according to claim 1, wherein the monitoring unit controls the charge-accumulation operation of the first photoelectric conversion unit based on a difference between a maximum value and a minimum value of signals that are output from the unit pixels.

3. The photoelectric conversion device according to claim 1, wherein each of the unit pixels further includes a signal output unit for amplifying the signal output from the pixel output unit.

4. The photoelectric conversion device according to claim 3, wherein each of the signal output units includes a noise-reduction circuit for reducing a noise generated in the pixel output unit.

5. The photoelectric conversion device according to claim 1, wherein a photo-receiving area of the first photoelectric conversion unit is larger than a photo-receiving area of the second photoelectric conversion unit.

6. The photoelectric conversion device according to claim 1, wherein each of the unit pixels further includes a second transfer unit for transferring the electric charge generated by the second photoelectric conversion unit to the pixel output unit.

7. An auto-focusing apparatus comprising the photoelectric conversion device according to claim 1.

8. The auto-focusing apparatus according to claim 7, wherein the monitoring unit of the photoelectric conversion device controls the charge-accumulation operation of the first photoelectric conversion unit based on a difference between a maximum value and a minimum value of signals that are output from the unit pixels.

9. The auto-focusing apparatus according to claim 7, wherein each of the unit pixels of the photoelectric conversion device further includes a signal output unit for amplifying the signal output from the pixel output unit.

10. The auto-focusing apparatus according to claim 9, wherein each of the signal output units of the photoelectric conversion device includes a noise-reduction circuit for reducing a noise generated in the pixel output unit.

11. The auto-focusing apparatus according to claim 7, wherein a photo-receiving area of the first photoelectric conversion unit of the photoelectric conversion device is larger than a photo-receiving area of the second photoelectric conversion unit.

12. The auto-focusing apparatus according to claim 7, wherein each of the unit pixels of the photoelectric conversion device further includes a second transfer unit for transferring the electric charge generated by the second photoelectric conversion unit to the pixel output unit.

13. An image pickup system comprising the auto-focusing apparatus according to claim 7.

14. The image pickup system according to claim 13, wherein the monitoring unit of the photoelectric conversion device controls the charge-accumulation operation of the first photoelectric conversion unit based on a difference between a maximum value and a minimum value of signals that are output from the unit pixels.

15. The image pickup system according to claim 13, wherein each of the unit pixels of the photoelectric conversion device further includes a signal output unit for amplifying the signal output from the pixel output unit.

16. The image pickup system according to claim 15, wherein each of the signal output units of the photoelectric conversion device includes a noise-reduction circuit for reducing a noise generated in the pixel output unit.

17. The image pickup system according to claim 13, wherein a photo-receiving area of the first photoelectric conversion unit of the photoelectric conversion device is larger than a photo-receiving area of the second photoelectric conversion unit.

18. The image pickup system according to claim 13, wherein each of the unit pixels of the photoelectric conversion device further includes a second transfer unit for transferring the electric charge generated by the second photoelectric conversion unit to the pixel output unit.

19. A photoelectric conversion device comprising:
a plurality of unit pixels, each having a first photoelectric conversion unit, a second photoelectric conversion unit, a pixel output unit for outputting a signal based on an amount of electric charge generated by at least one of the first and second photoelectric conversion units, and a first transfer unit for transferring electric charge generated by the first photoelectric conversion unit to the pixel output unit; and
a monitoring unit for controlling a charge-accumulation operation of the first photoelectric conversion unit based on a signal output from the pixel output unit, the signal being generated based on an amount of electric charge generated by the second photoelectric conversion unit; wherein
the monitoring unit controls the charge-accumulation operation of the first photoelectric conversion unit based on a difference between a maximum value and a minimum value of signals that are output from the unit pixels.

20. An auto-focusing apparatus comprising the photoelectric conversion device according to claim 19.

21. An image pickup system comprising the auto-focusing apparatus according to claim 20.

* * * * *